United States Patent
Scott et al.

(10) Patent No.: US 11,201,857 B2
(45) Date of Patent: Dec. 14, 2021

(54) DOMAIN TRANSCENDENT FILE CRYPTOLOGY NETWORK

(71) Applicant: Disney Enterprises, Inc., Burbank, CA (US)

(72) Inventors: Thomas C. Scott, Simi Valley, CA (US); Matthew D. Estes, Celebration, FL (US); Douglas A. Hill, Winter Garden, FL (US)

(73) Assignee: Disney Enterprises, Inc., Burbank, CA (US)

( * ) Notice: Subject to any disclaimer, the term of this patent is extended or adjusted under 35 U.S.C. 154(b) by 218 days.

(21) Appl. No.: 16/708,080

(22) Filed: Dec. 9, 2019

(65) Prior Publication Data

US 2021/0176222 A1 Jun. 10, 2021

(51) Int. Cl.
*H04L 29/06* (2006.01)
*H04L 9/32* (2006.01)

(52) U.S. Cl.
CPC ........ *H04L 63/0471* (2013.01); *H04L 9/3228* (2013.01); *H04L 9/3239* (2013.01)

(58) Field of Classification Search
CPC . H04L 63/0471; H04L 9/3228; H04L 9/3239; H04L 2209/76; H04L 9/0866; H04L 9/083; H04L 9/0894; H04L 63/00
See application file for complete search history.

(56) References Cited

U.S. PATENT DOCUMENTS

| | | | |
|---|---|---|---|
| 8,719,572 B2* | 5/2014 | Schertzinger | H04L 63/062 713/170 |
| 8,755,526 B2 | 6/2014 | Robert | |
| 2008/0317249 A1* | 12/2008 | Bates | H04L 9/0869 380/255 |
| 2010/0017596 A1* | 1/2010 | Schertzinger | G06F 21/41 713/155 |
| 2011/0007903 A1* | 1/2011 | Robert | H04L 63/0428 380/279 |
| 2012/0019355 A1* | 1/2012 | Katayama | H04L 9/088 340/5.6 |
| 2021/0058378 A1* | 2/2021 | Bursell | H04L 63/0435 |

* cited by examiner

*Primary Examiner* — J. Brant Murphy
(74) *Attorney, Agent, or Firm* — Farjami & Farjami LLP

(57) ABSTRACT

A domain transcendent file cryptology network includes a first data cryptology node in a first data domain having a first security protocol. A hardware processor of the first data cryptology node executes a first instantiation of a software code to receive a request to transfer a data file from the first data domain to a second data domain having a second, different, security protocol, obtain one or more characteristics of the data file, and generate an authentication tag for the data file based on the characteristic(s). The first instantiation of the software code also encrypts the data file and transmits the encrypted data file, the authentication tag, and a decryption key to a second data cryptology node in the second data domain. The decryption key and the authentication tag enable decryption of the encrypted data file by a second instantiation of the software code on the second data cryptology node.

20 Claims, 4 Drawing Sheets

DOMAIN TRANSCENDENT FILE CRYPTOLOGY NETWORK

BACKGROUND

Some modern data workflows require the transfer and coordination of data files between distinct data domains maintained by different cloud providers and governed by different security protocols. For example, cloud services provided by MICROSOFT®, AMAZON®, and GOOGLE®, each offers a distinct authentication and encryption solution. Consequently, when a workload extends across two or more different cloud service providers, that workload typically requires separate key management solutions that can impose significant administrative overhead to track and protect data assets.

One conventional solution for avoiding the direct burdens of working with multiple key management solutions is to outsource these functions to a third party vendor. However, reliance on a third party key management and data security service requires licensing, and imposes its own set of administrative costs. Moreover, outsourced security solutions can be vulnerable to attacks and malicious software, and may need to be carefully monitored to ensure that they are continuously kept up to date. Thus, there is a need in the art for a cryptology solution providing robust data tracking and security, while enabling seamless workflows across multiple cloud service providers.

SUMMARY

There are provided domain transcendent file cryptology networks and methods for use by such networks, substantially as shown in and/or described in connection with at least one of the figures, and as set forth more completely in the claims.

DETAILED DESCRIPTION

Figure 1:
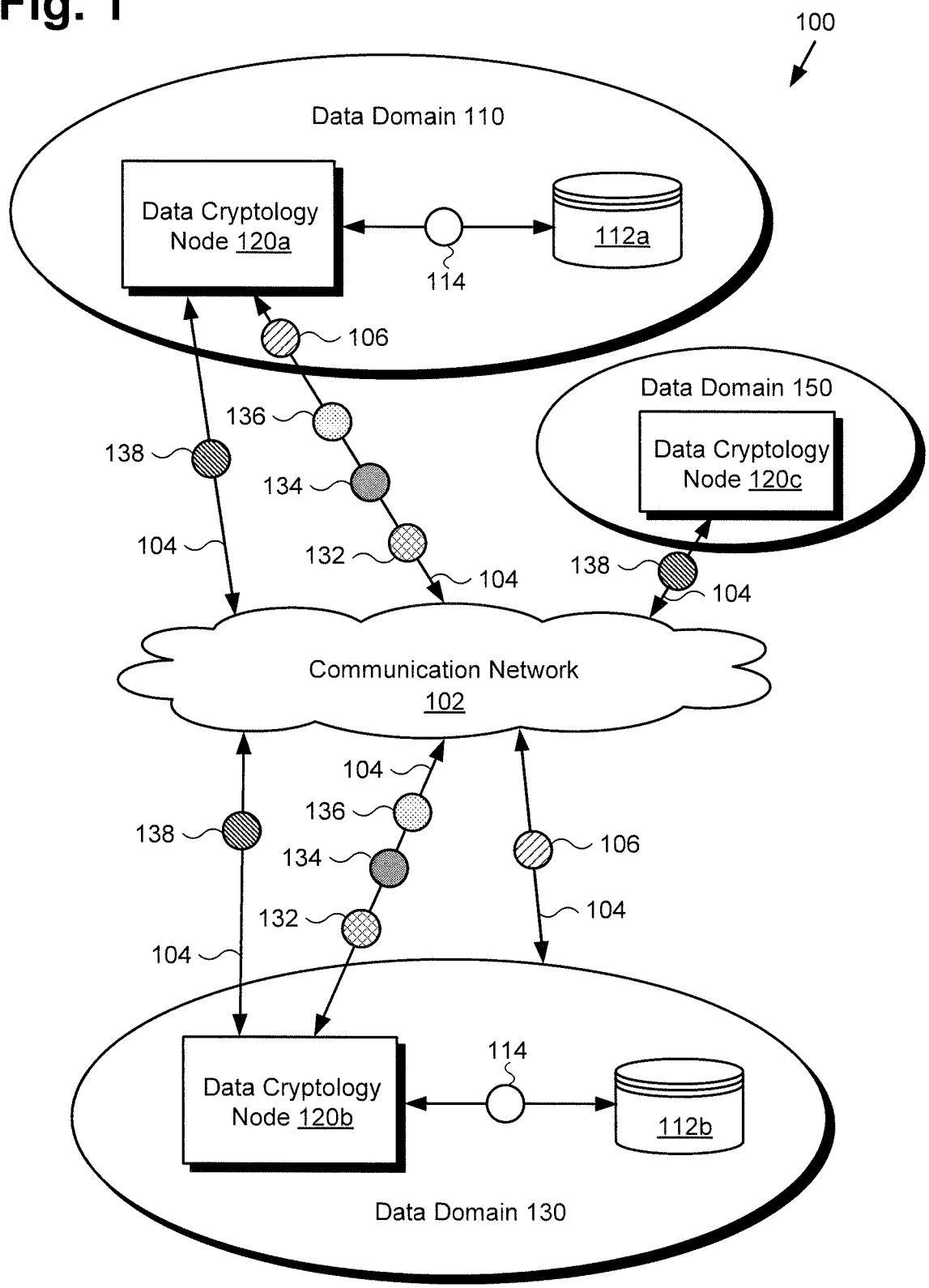
FIG. 1 shows a diagram of an exemplary domain transcendent file cryptology network, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, modern data workflows may require the transfer and coordination of data files between distinct data domains maintained by different cloud providers and governed by different security protocols including distinct authentication and encryption solutions. Consequently, when a workload extends across two or more data domains maintained by different cloud service providers, that workload typically requires separate key management solutions that can impose significant administrative overhead to track and protect data assets.

The present application discloses domain transcendent file cryptology networks and methods for use by such networks that overcome the drawbacks and deficiencies in the conventional art by providing robust data tracking and security, while enabling seamless workflows across multiple cloud service providers. The domain transcendent file cryptology solutions disclosed herein improve the technology in the conventional art by advantageously enabling the unique identification of a data file based on its attributes or characteristics in order to ensure appropriate access to and use of the data file. For workloads that utilize multiple cloud providers, the present approach tracks and identifies data files across cloud providers, while concurrently enhancing data security by utilizing a single crypto-key solution. As a result, authentication and data file access can advantageously be managed regardless of where the workload is initiated or where it is subsequently processed, without the involvement of a third party key management provider. Moreover, in some implementations, the present domain transcendent file cryptology solution may be performed as a substantially automated process by a substantially automated network.

It is noted that, as used in the present application, the terms "automation," "automated", and "automating" refer to networks and processes that do not require the participation of a human user, such as a network administrator. Although, in some implementations, a human operator or administrator may review the performance of the automated networks executing the automated methods described herein, that human involvement is optional. Thus, the methods described in the present application may be performed under the control of hardware processing components described herein.

FIG. 1 shows a diagram of an exemplary domain transcendent file cryptology network, according to one implementation. As shown in FIG. 1, domain transcendent file cryptology network 100 can include multiple data cryptology nodes, such as first data cryptology node 120*a*, second data cryptology node 120*b*, and third data cryptology node 120*c* interactively linked by communication network 102. According to the exemplary implementation shown in FIG. 1, first data cryptology node 120*a* is in first data domain 110 including database 112*a*, second data cryptology node 120*b* is in second data domain 130 including database 112*b*, and third data cryptology node 120*c* is in third data domain 150.

It is noted that each of first, second, and third data domains 110, 130, and 150 may be a distinct cloud service provider, for example, governed by different respective security protocols. That is to say, first data domain 110 may be governed by a first security protocol, second data domain 130 may be governed by a second security protocol different from the first security protocol governing first data domain 110, and third data domain 150 may be governed by yet another security protocol (e.g., a security protocol that is the same as one of the first security protocol or the second security protocol, or a third security protocol that is different from both the first security protocol and the second security protocol). It is further noted that, as used in the present application, the expression "first data domain 110 and second data domain 130 being governed by different security protocols," and the like, refer to the implementation of distinct authentication and encryption strategies by each of first and second data domains 110 and 130, that require separate key management solutions for accessing data files stored on those domains.

It is also noted that although FIG. 1 shows three data domains, each including a single data cryptology node in the interests of conceptual clarity, in other implementations, domain transcendent file cryptology network 100 may transcend as few as two data domains, or more, or many more than three data domains. Moreover, while in some implementations, domain transcendent file cryptology network 100 may include a single data cryptology node in each distinct data domain, in other implementations, some or all of the data domains transcended by domain transcendent file cryptology network 100 may include multiple data cryptology nodes.

In addition to the features described above, FIG. 1 further shows network communication links 104 of communication network 102, file transfer request 106, data file 114, encrypted data file 132 corresponding to data file 114, authentication tag 134 for data file 114, and decryption key 136 for decrypting encrypted data file 132. Also shown in FIG. 1 is file status data 138.

Each of first, second, and third data cryptology nodes 120a, 120b, and 120c may be implemented as one or more computing platforms, such as computer servers for example, which form interactively linked but domain transcendent file cryptology network 100. In one implementation, for example, first, second, and third data cryptology nodes 120a, 120b, and 120c of domain transcendent file cryptology network 100 may correspond to one or more web servers, accessible over communication network 102 in the form of a packet-switched network such as the Internet. Alternatively, first, second, and third data cryptology nodes 120a, 120b, and 120c may correspond to one or more computer servers supporting communication network 102 in the form of a wide area network (WAN), a local area network (LAN), or another type of limited distribution or private network.

By way of overview, in one exemplary use case, first data cryptology node 120a may receive file transfer request 106 for transfer of data file 114 stored in first data domain 110 to second data domain 130 governed by a different security protocol than the security protocol governing first data domain 110. First data cryptology node 120a includes a hardware processor for executing a first instantiation of a software code (neither being shown in FIG. 1) to obtain distinctive characteristics of data file 114, to generate authentication tag 134 for data file 114 based on its distinctive file characteristics, and to encrypt data file 114 to generate encrypted data file 132. First data cryptology node 120a may then transmit, in response to receiving file transfer request 106, encrypted data file 132, authentication tag 134, and decryption key 136 for decrypting encrypted data file 132 to second data cryptology node 120b in second data domain 130. According to various implementations of the present concepts, decryption key 136 and authentication tag 134 enable decryption of encrypted data file 132 by a second instantiation of the software code (also not shown in FIG. 1) that is resident on second data cryptology node 120b.

After its decryption using decryption key 136 and authentication tag 134, data file 114 may be accessed and/or processed in second data domain 130, and may be stored within second data domain 130, on database 112b. Following the accessing, and/or processing, and/or storage of data file 114 on second data domain 130, file status data 138 may be broadcast by second data cryptology node 120b to all other data cryptology nodes of domain transcendent file cryptology network 100, thereby concurrently maintaining fully updated and matching records of the use history and location of data file 114 at each of first, second, and third data cryptology nodes 120a, 120b, and 120c.

Figure 2:
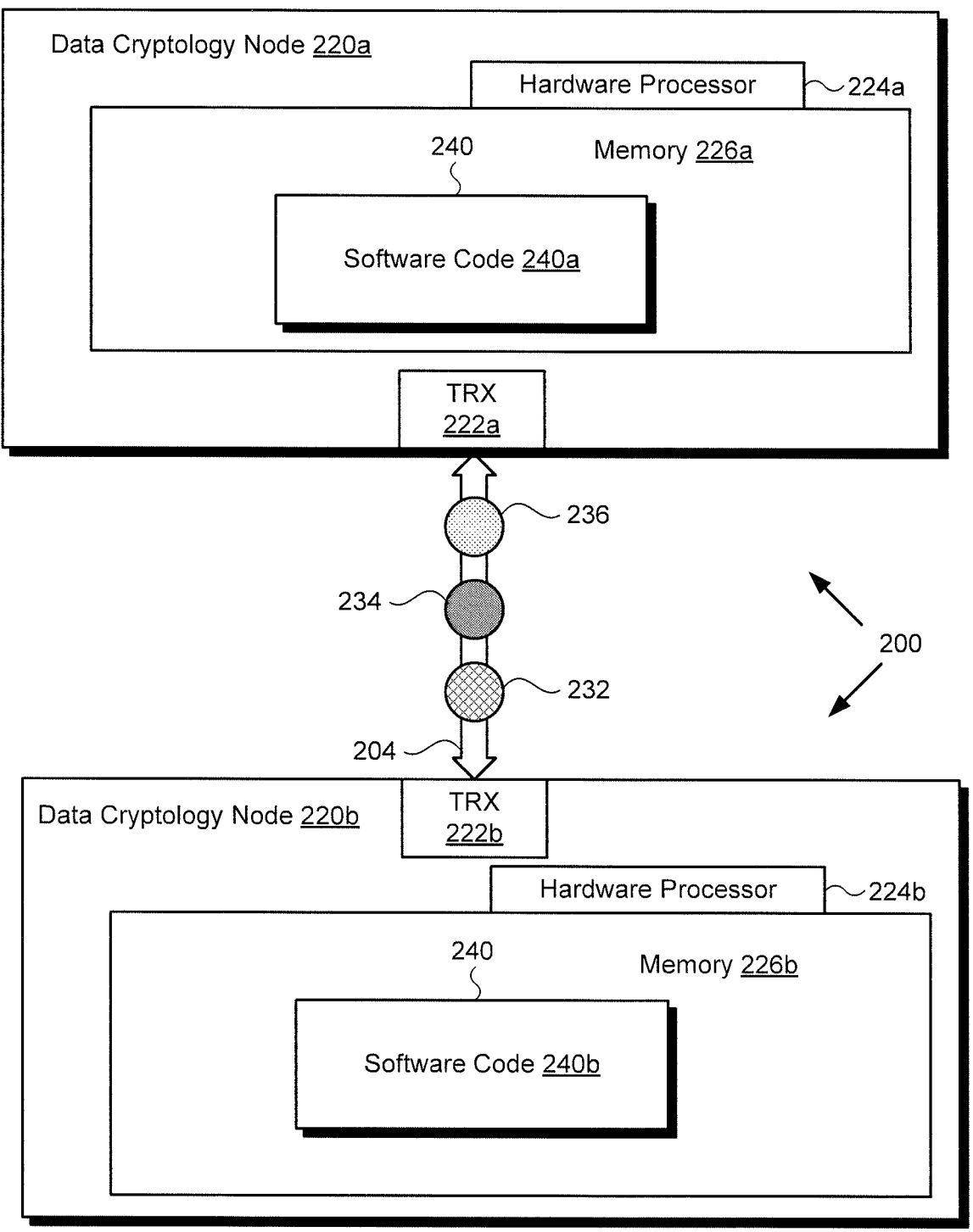
FIG. 2 shows an exemplary interaction between first and second data cryptology nodes of the network shown in FIG. 1, according to one implementation.

FIG. 2 shows an exemplary interaction between first and second data cryptology nodes 220a and 220b of domain transcendent file cryptology network 200, according to one implementation. According to the exemplary implementation shown in FIG. 2, first and second data cryptology nodes 220a and 220b are interactively connected via network communication link 204. Network communication link 204 and domain transcendent file cryptology network 200 correspond respectively in general to network communication links 104, and domain transcendent file cryptology network 100, in FIG. 1. Also shown in FIG. 2 are encrypted data file 232, authentication tag 234, and decryption key 236 corresponding respectively in general to encrypted data file 132, authentication tag 134, and decryption key 136, in FIG. 1.

As further shown in FIG. 2, first data cryptology node 220a includes transceiver 222a, hardware processor 224a, and memory 226a implemented as a non-transitory storage device storing first instantiation 240a of software code 240, while second data cryptology node 220b includes transceiver 222b, hardware processor 224b, and memory 226b implemented as a non-transitory storage device storing second instantiation 240b of software code 240. It is noted that, although the present application refers to first and second instantiations 240a and 240b of software code 240 as being stored in respective memories 226a and 226b for conceptual clarity, more generally, either or both of memories 226a and 226b may take the form of any computer-readable non-transitory storage medium. The expression "computer-readable non-transitory storage medium," as used in the present application, refers to any medium, excluding a carrier wave or other transitory signal that provides instructions to hardware processor 224a of first data cryptology node 220a, or to hardware processor 224b of second data cryptology node 220b. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

Hardware processors 224a and 224b may be the central processing units (CPUs) for respective first and second data cryptology nodes 220a and 220b, for example, in which role hardware processors 224a and 224b control respective transceivers 222a and 222b, and execute respective first and second instantiations 240a and 240b of software code 240. Transceivers 222a and 222b may be implemented as wireless communication units enabling first and second data cryptology nodes 220a and 220b to exchange data via network communication link 204. For example, transceivers 222a and 222b may be implemented as fourth generation (4G) wireless transceivers, or as 5G wireless transceivers configured to satisfy the IMT-2020 requirements established by the International Telecommunication Union (ITU). Alternatively, or in addition, transceivers 222a and 222b may be configured to support Wireless Fidelity (WiFi), Worldwide Interoperability of Microwave Access (WiMAX) communications, or any other suitable wireless communication protocol.

First and second data cryptology nodes 220a and 220b, in FIG. 2, correspond respectively in general to first and second data cryptology nodes 120a and 120b, in FIG. 1, and those corresponding features may share any of the characteristics attributed to either feature by the present disclosure. That is to say, although not shown in FIG. 1, first data cryptology node 120a may include features corresponding respectively to transceiver 222a, hardware processor 224a, and memory 226a storing first instantiation 240a of software code 240. Moreover, and while also not shown in FIG. 1, second data cryptology node 120b may include features corresponding respectively to transceiver 222b, hardware processor 224b, and memory 226b storing second instantiation 240b of software code 240.

Figure 3:
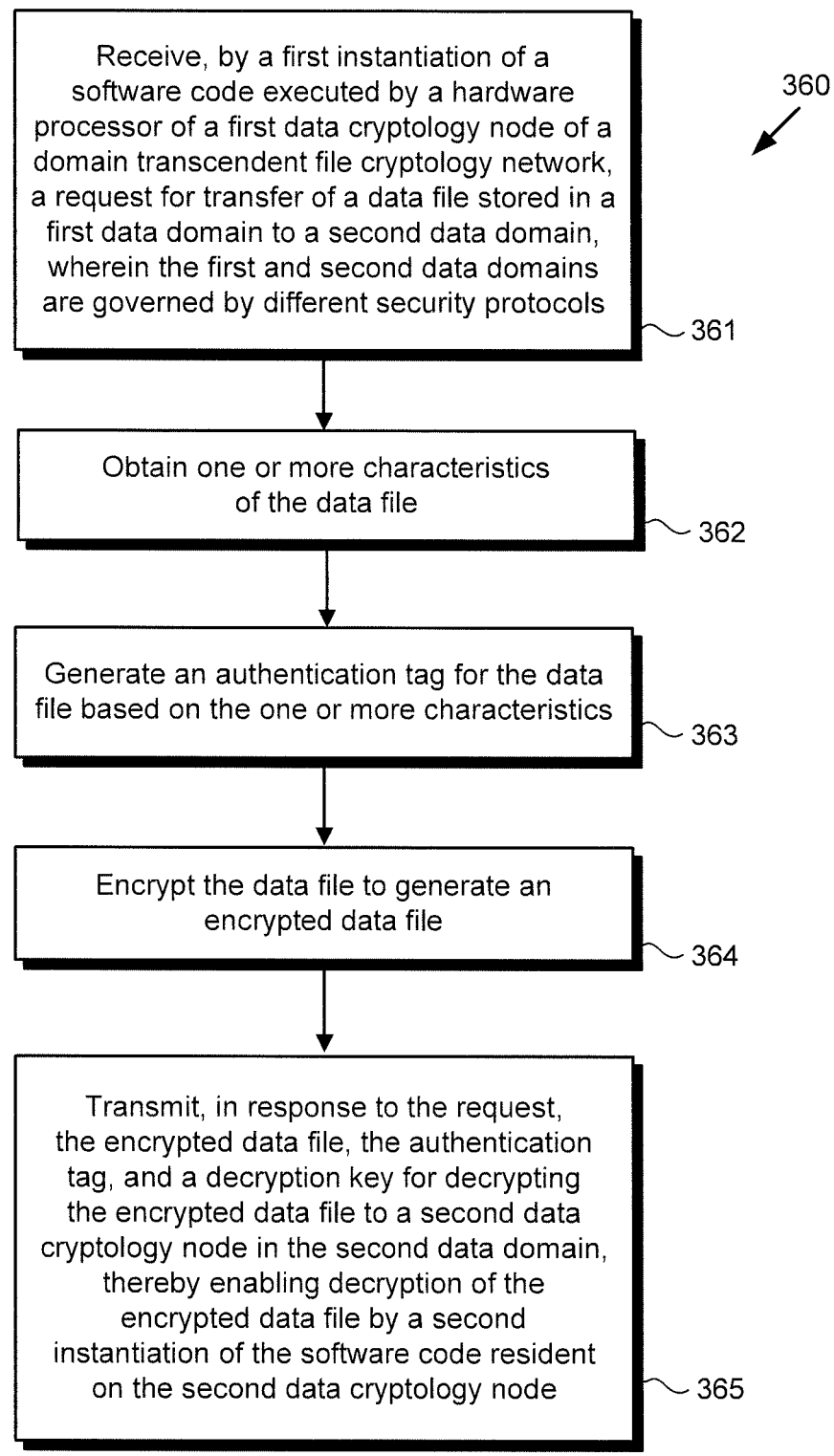
FIG. 3 is a flowchart presenting an exemplary method for use by a domain transcendent file cryptology network, according to one implementation.

The functionality of software code 240 will be further described by reference to FIG. 3 in combination with FIGS. 1, 2, and 4. FIG. 3 shows flowchart 360 presenting an exemplary method for use by a domain transcendent file cryptology network, according to one implementation. With respect to the method outlined in FIG. 3, it is noted that certain details and features have been left out of flowchart 360 in order not to obscure the discussion of the inventive features in the present application.

Figure 4:
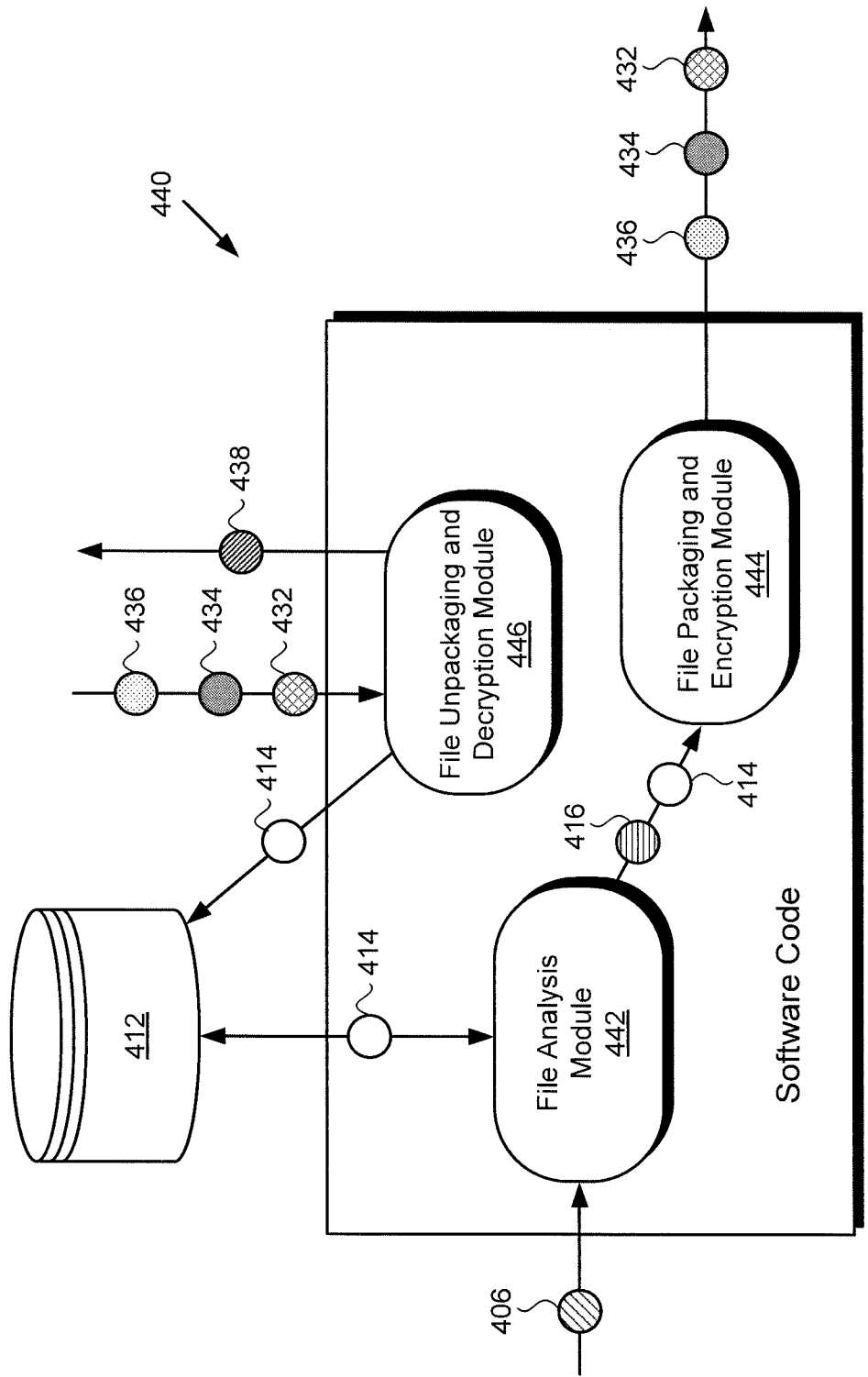
FIG. 4 shows an exemplary diagram of a software code suitable for execution by a data cryptology node of the network shown in FIG. 1, according to one implementation.

FIG. 4 shows an exemplary diagram of software code 440 suitable for execution by the data cryptology nodes of domain transcendent file cryptology network 100/200, according to one implementation. As shown in FIG. 4, software code 440 is communicatively coupled to database 412 and may include file analysis module 442, file packaging and encryption module 444, and file unpackaging and decryption module 446. In addition, FIG. 4 shows file transfer request 406, data file 414, one or more characteristics 416 of data file 414, encrypted data file 432 corresponding to data file 414, authentication tag 434 for data file 414, decryption key 436 for decrypting encrypted data file 432, and file status data 438.

Database 412, data file 414, and file status data 438 correspond respectively in general to databases 112a and/or 112b, data file 114, and file status data 138, in FIG. 1, and may share any of the characteristics attributed to those corresponding features by the present disclosure. In addition, software code 440 corresponds in general to first and second instantiations 240a and 240b of software code 240, in FIG. 2. That is to say, like software code 440, each of first and second instantiations 240a and 240b of software code 240 may include modules corresponding respectively to file analysis module 442, file packaging and encryption module 444, and file unpackaging and decryption module 446.

Moreover, encrypted data file 432, authentication tag 434, and decryption key 436 correspond respectively in general to encrypted data file 132/232, authentication tag 134/234, and decryption key 136/236 in FIGS. 1 and 2. Thus, encrypted data file 132/232, authentication tag 134/234, and decryption key 136/236 may share any of the characteristics attributed to respective encrypted data file 432, authentication tag 434, and decryption key 436 by the present disclosure, and vice versa.

Referring to FIG. 3 in combination with FIGS. 1, 2, and 4, flowchart 360 begins with receiving, by first instantiation 240a of software code 240/440 executed by hardware processor 224a of first data cryptology node 120a/220a of domain transcendent file cryptology network 100/200, file transfer request 106/406 to transfer data file 114/414 stored in first data domain 110 to second data domain 130, where first data domain 110 and second data domain 130 are governed by different security protocols (action 361). As noted above by reference to FIG. 1, the expression "first data domain 110 and second data domain 130 being governed by different security protocols," and the like, refer to the implementation of distinct authentication and encryption strategies by each of first and second data domains 110 and 130, that require separate key management solutions for accessing data files stored on those domains.

Moreover, although action 361 alludes to transfer of data file 114/414 from first data domain 110 to second data domain 130, that example is merely illustrative. The actions described by flowchart 360 may involve transfer of data file 114/414 between any data domains transcended by domain transcendent file cryptology network 100/200. Thus, although data domain 110 is referred to herein as a "first data domain" and data domain 130 is referred to as a "second data domain" as a matter of convenience, more generally, any one of data domains 110, 130, and 150 may serve as the "first data domain" recited by flowchart 360, and any other of data domains 110, 130, and 150 may serve as the "second data domain."

Data file 114/414 may include any of a wide variety of data assets, including software code, financial or business records, one or more graphical images, or media content, for example. Accordingly, data file 114/414 may assume any of a wide variety of data formats. That is to say, data file 114/414 may be a Microsoft® Word, Excel, or PowerPoint® file, a Portable Document Format (PDF) file, or may assume any email file format, to name a few examples. When data file 114/414 includes media content, such content may include one or more audio-video files in the form of movies, episodic content including television shows or web-based shows, and video games, for example, as well as one or more video files from which audio is omitted, or one or more audio files such as music, or electronic text such as digital books or other publications.

Flowchart 360 continues with obtaining one or more characteristics 416 of data file 114/414 (action 362). For example, hardware processor 224a of first data cryptology node 120a/220a may execute first instantiation 240a of software code 240/440 of retrieved data file 114/414 from database 112a/412. Once retrieved from database 112a/412, first instantiation 240a of software code 240/440 may utilize file analysis module 442 to detect or otherwise obtain one or more characteristics 416 attributable to data file 114/414 from data file 114/414, as well as, in some implementations, from file transfer request 106/406. Examples of attributes or characteristics 416 of data file 114/414 obtained in action 362 may include the file format of data file 114/414, its file name, size, date of creation, originating user, owner, the Universally Unique Identifier (UUID, also sometimes referred to as Globally Unique Identifier or GUID) of first data cryptology node 120a/220a of first data domain 110, and the UUID or GUID of second cryptology node 120b/220b serving as the destination of data file 114/414 in second data domain 130, to name a few.

Flowchart 360 continues with generating authentication tag 134/234/434 for data file 114/414 based on the one or more characteristics 416 of data file 114/414 (action 363). Unlike conventional solutions, using the present domain transcendent file cryptology solution, data file 114/414 may be authenticated based on its own file attributes or characteristics, rather than based on a particular security protocol governing the data domain from which it originates or to which it is transferred during workflow. Thus, authentication tag 134/234/434 may include any of several attributes or characteristics 416 of data file 114/414, and/or file transfer request 106/406 while being agnostic to the different security protocols governing first and second data domains 110 and 130. Authentication tag 134/234/434 may be generated based on one or more characteristics 416 of data file 114/414 by first instantiation 240a of software code 240/440, executed by hardware processor 224a of first data cryptology node 120a/220a, and using file packaging and encryption module 444.

By way of example, authentication tag 134/234/434 may include a Secure Hashtag Algorithm 2 (SHA-2) sum of data file 114/414, such as a SHA-256 sum of data file 114/414 for instance. Alternatively, or in addition, authentication tag 134/234/434 may include one or more of the UUID or GUID of first data cryptology node 120a/220a, the UUID or GUID of second data cryptology node 120b/220b, and one or more expiration criteria for data file 114/414. Such expiration criteria may specify a time interval during which data file 114/414 may be accessed, or a maximum number of times that data file 114/414 may be accessed before it is locked or discarded, for instance. In some implementations, authentication tag 134/234/434 may also include one or more of the file name of data file 114/414, an originating user token identifying the creator of data file 114/414, the UUID or GUID of database 112a/412 from which data file 114/414 is retrieved, the UUID or GUID of database 112b/412 where data file 114/414 will be stored after transfer to second data domain 130, or the UUID or GUID of the intended destination Identity and Access Management (IAM) Role within second data domain 130.

It is noted that although flowchart 360 describes action 361 as preceding actions 362 and 363, that sequence is merely exemplary. In other implementations, action 361 may occur after either of actions 362 or 363. For example, in some implementations, when data file 114/414 is saved in first domain 110, one or more characteristics 416 of data file 114/414 may be obtained in action 462, and authentication tag 134/234/434 may be generated in action 363, before file transfer request 106/406 is received by first instantiation 240a of software code 240/440.

Flowchart 360 continues with encrypting data file 114/414 to generate encrypted data file 132/232/432 corresponding to data file 114/414 (action 364). The encryption of data file 114/414 resulting in generation of encrypted data file 132/232/432 may be performed by first instantiation 240a of software code 240/440, executed by hardware processor 224a of first data cryptology node 120a/220a, and using file packaging and encryption module 444.

In some implementations, exemplary flowchart 360 may conclude with transmitting, in response to receiving file transfer request 106/406, encrypted data file 132/232/432, authentication tag 134/234/434, and decryption key 136/236/436 for decrypting encrypted data file 132/232/432 to second data cryptology node 120b/220b in second data domain 130 (action 365). It is noted that action 365 enables decryption of encrypted data file 132/232/432 by second instantiation 240b of software code 240/440 resident on second data cryptology node 120b/220b. Action 365 may be performed by first instantiation 240a of software code 240/440, executed by hardware processor 224a of first data cryptology node 120a/220a, and using file packaging and encryption module 444 and transceiver 222a.

It is further noted that, subsequent to action 365, or substantially concurrently with action 365, encrypted data file 132/232/432, authentication tag 134/234/434, and decryption key 136/236/436 may be received by second instantiation 240b of software code 240/440, executed by hardware processor 224b of second data cryptology node 120b/220b, and using file unpackaging and decryption module 446 and transceiver 222b. Encrypted data file 132/232/432 may then be decrypted to provide data file 114/414, which may be stored and accessible locally in second data domain 130 on database 112b/412.

Although not included in the exemplary outline provided by flowchart 360, in some implementations, the present method may further include generating a container file or container file system for encrypted data file 132/232/432, such as a Docker® file or file system, for example, prior to its transmission to second data cryptology node 120b/220b in action 365. In those implementations, an additional level of security may be provided to encrypted data file 132/232/432 by the additional encrypting of the container file or file system including encrypted data file 132/232/432. Generation of a container file or file system for encrypted data file 132/232/432, as well as encryption of that container file or file system, may be performed by first instantiation 240a of software code 240/440, executed by hardware processor 224a of first data cryptology node 120a/220a, and using file packaging and encryption module 444.

It is noted that in implementations in which encrypted data file 132/232/432 is transmitted in an encrypted container file or file system in action 365, decryption key 136/236/436 and authentication tag 134/234/434 generated in first data domain 110 also enable decryption of the encrypted container file or file system by second instantiation 240b of software code 240/440 resident on second data cryptology node 120b/220b. Moreover, in those implementations, authentication tag 134/234/434 may further include one or more of the container name, the container label, a container image ID, or a SHA-2 corresponding to a container image of the container file or file system, such as a SHA-256 of the container image ID, for example.

As noted above, after its decryption using decryption key 136/236/436 and authentication tag 134/234/434, data file 114/414 may be accessed and/or processed in second data domain 130, and may be stored within second data domain 130, on database 112b/412. Following, the accessing, and/or processing, and/or storage of data file 114/414 on second data domain 130, it may be advantageous or desirable to broadcast file status data 138/438 to all other data cryptology nodes of domain transcendent file cryptology network 100/200, thereby concurrently maintaining fully updated and matching records of the use history and location of data file 114/414 at each of first, second, and third data cryptology nodes 120a/220a, 120b/220b, and 120c. In those implementations, broadcasting of file status data 138/438 to first and third data cryptology nodes 120a/220a and 120c may be performed by second instantiation 240b of software code 240/440, executed by hardware processor 224b of second data cryptology node 120b/220b, and using file unpackaging and decryption module 446 and transceiver 222b.

Thus, the present application discloses domain transcendent file cryptology networks and methods for use by such networks that overcome the drawbacks and deficiencies in the conventional art. As discussed above, the cryptology solutions disclosed herein advantageously enable the unique identification of a data file based on its characteristics in order to ensure appropriate access to and use of the data file. For workloads that utilize multiple cloud providers, the present approach tracks and identifies data files across cloud providers, while concurrently enhancing data security by utilizing a single crypto-key solution. As a result, authentication and data file access can advantageously be managed regardless of where the workload is initiated or where it is subsequently processed, without the involvement of a third party key management provider.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A method for use by a domain transcendent file cryptology network including a first data cryptology node in a first data domain governed by a first security protocol, the first data cryptology node having a hardware processor and a memory storing a first instantiation of a software code, the method comprising:
   receiving, by the first instantiation of the software code executed by the hardware processor of the first data cryptology node, a request to transfer a data file stored in the first data domain to a second data domain governed by a second security protocol different from the first security protocol;
   obtaining, by the first instantiation of the software code executed by the hardware processor of the first data cryptology node, one or more characteristics of the data file;
   generating, by the first instantiation of the software code executed by the hardware processor of the first data cryptology node, an authentication tag for the data file based on the one or more characteristics of the data file;
   encrypting, by the first instantiation of the software code executed by the hardware processor of the first data cryptology node, the data file to generate an encrypted data file; and
   transmitting, in response to the request, by the first instantiation of the software code executed by the hardware processor of the first data cryptology node, the encrypted data file, the authentication tag, and a decryption key for decrypting the encrypted data file to a second data cryptology node in the second data domain;
   wherein the decryption key and the authentication tag enable decryption of the encrypted data file and authentication of the decrypted data file, respectively, by a second instantiation of the software code resident on the second data cryptology node.

2. The method of claim 1, wherein generating the authentication tag comprises generating a Secure Hash Algorithm 2 (SHA-2) sum of the data file.

3. The method of claim 1, wherein generating the authentication tag comprises generating a SHA-256 sum of the data file.

4. The method of claim 1, wherein the authentication tag comprises a Universally Unique Identifier (UUID) of the first data cryptology node.

5. The method of claim 1, wherein the authentication tag comprises a UUID of the second data cryptology node.

6. The method of claim 1, further comprising:
   generating, by the first instantiation of the software code executed by the hardware processor of the first data cryptology node, a container file for the encrypted data file; and
   encrypting, by the first instantiation of the software code executed by the hardware processor of the first data cryptology node, the container file to generate an encrypted container file including the encrypted data file;
   wherein the decryption key and the authentication tag generated in the first data domain also enable decryption of the encrypted container file by the second instantiation of the software code resident on the second data cryptology node.

7. The method of claim 6, wherein the authentication tag comprises a SHA-2 corresponding to a container image of the container file.

8. The method of claim 1, wherein the authentication tag comprises one or more expiration criteria the data file.

9. The method of claim 1, wherein the data file comprises a graphical image.

10. The method of claim 1, wherein the data file comprises an audio-video file.

11. A domain transcendent file cryptology network comprising:
    a first data cryptology node in a first data domain governed by a first security protocol, the first data cryptology node having a hardware processor and a memory storing a first instantiation of a software code;
    the hardware processor being configured to execute the first instantiation of the software code to:
       receive a request to transfer a data file stored in the first data domain to a second data domain governed by a second security protocol different from the first security protocol;
       obtain one or more characteristics of the data file;
       generate an authentication tag for the data file based on the one or more characteristics of the data file;
       encrypt the data file to generate an encrypted data file; and
       transmit, in response to the request, the encrypted data file, the authentication tag, and a decryption key for decrypting the encrypted data file to a second data cryptology node in the second data domain;
    wherein the decryption key and the authentication tag enable decryption of the encrypted data file and authentication of the decrypted data file, respectively, by a second instantiation of the software code resident on the second data cryptology node.

12. The domain transcendent file cryptology network of claim 11, wherein the authentication tag comprises a Secure Hash Algorithm 2 (SHA-2) sum of the data file.

13. The domain transcendent file cryptology network of claim 11, wherein the authentication tag comprises a SHA-256 sum of the data file.

14. The domain transcendent file cryptology network of claim 11, wherein the authentication tag comprises a Universally Unique Identifier (UUID) of the first data cryptology node.

15. The domain transcendent file cryptology network of claim 11, wherein the authentication tag comprises a UUID of the second data cryptology node.

16. The domain transcendent file cryptology network of claim 11, wherein the hardware processor is further configured to execute the first instantiation of the software code to:

generate a container file for the encrypted data file; and
encrypt the container file to generate an encrypted container file including the encrypted data file;
wherein the decryption key and the authentication tag generated in the first data domain also enable decryption of the encrypted container file by the second instantiation of the software code resident on the second data cryptology node.

17. The domain transcendent file cryptology network of claim 16, wherein the authentication tag comprises a SHA-2 corresponding to a container image of the container file.

18. The domain transcendent file cryptology network of claim 11, wherein the authentication tag comprises one or more expiration criteria for the data file.

19. The domain transcendent file cryptology network of claim 11, wherein the data file comprises a graphical image.

20. The domain transcendent file cryptology network of claim 11, wherein the data file comprises an audio-video file.

* * * * *